United States Patent
Gerst (10) Patent No.: US 9,200,658 B2
(45) Date of Patent: Dec. 1, 2015

(54) GUSSET

(71) Applicant: Paul R. Gerst, Newport Beach, CA (US)

(72) Inventor: Paul R. Gerst, Newport Beach, CA (US)

(*) Notice: Subject to any disclaimer, the term of this patent is extended or adjusted under 35 U.S.C. 154(b) by 0 days.

(21) Appl. No.: 14/466,571

(22) Filed: Aug. 22, 2014

(65) Prior Publication Data

US 2015/0059282 A1    Mar. 5, 2015

Related U.S. Application Data

(60) Provisional application No. 61/871,738, filed on Aug. 29, 2013.

(51) Int. Cl.
*E04B 1/24* (2006.01)
*F16B 15/00* (2006.01)
*F16B 7/00* (2006.01)
*F16B 11/00* (2006.01)
*E02B 3/06* (2006.01)

(52) U.S. Cl.
CPC ............. *F16B 15/0046* (2013.01); *E02B 3/064* (2013.01); *F16B 7/00* (2013.01); *F16B 11/006* (2013.01)

(58) Field of Classification Search
CPC .............. E04B 1/24; E04B 2001/2415; E04B 2001/2448; E04B 2001/2498; E04B 2001/2463
USPC ............. 52/712, 781, 586.1, 586.2, 848, 239, 52/650.1, 650.2, 653.1, 656.1, 656.2
See application file for complete search history.

(56) References Cited

U.S. PATENT DOCUMENTS

| | | |
|---|---|---|
| 2,652,694 A | 9/1953 | Melges |
| 3,279,141 A | 10/1966 | Schmidt |
| 3,760,754 A | 9/1973 | Drummond et al. |
| 4,070,980 A | 1/1978 | Shorter, Jr. |
| 4,168,922 A * | 9/1979 | Worrallo ............... 403/231 |
| 4,260,293 A | 4/1981 | Peterson |
| 4,502,260 A * | 3/1985 | Machler ............... 52/656.9 |
| 4,660,495 A | 4/1987 | Thompson |
| 4,709,647 A | 12/1987 | Rytand |
| 4,809,859 A * | 3/1989 | Chung ............... 220/4.01 |
| 4,867,093 A | 9/1989 | Sullivan |
| 4,940,021 A | 7/1990 | Rytand |
| 5,298,681 A * | 3/1994 | Swift et al. ............... 174/97 |
| 5,412,915 A | 5/1995 | Johnson |
| 5,429,063 A | 7/1995 | Rosenkranz |
| 5,584,606 A | 12/1996 | Hoogasian, Jr. |
| 5,845,594 A | 12/1998 | Hallsten et al. |
| 6,205,945 B1 | 3/2001 | Passen et al. |
| 6,230,644 B1 | 5/2001 | Passen et al. |
| 6,427,403 B1 | 8/2002 | Tambakis |

(Continued)

OTHER PUBLICATIONS www.woodworkweb.com/woodworking-videos/243-making-splines-for-picture-frame-corners.html, "Making Splines for picture Frame Corners".*

(Continued)

*Primary Examiner* — Jeanette E Chapman
*Assistant Examiner* — Daniel Kenny
(74) *Attorney, Agent, or Firm* — Stetina Brunda Garred & Brucker (57) ABSTRACT

An improved joint member, e.g., a gusset, is provided and is formed from a fiber-reinforced pultruded material. The improved gusset is more lightweight and inexpensive to manufacture than conventional gussets. Furthermore, the fiber-reinforced material is strong enough to provide the structural support needed in most platform-type systems.

14 Claims, 5 Drawing Sheets

(56) References Cited

U.S. PATENT DOCUMENTS

| | | | |
|---|---|---|---|
| 6,431,794 B1 | 8/2002 | Zweber | |
| 6,796,262 B2 | 9/2004 | Moses | |
| 6,871,607 B2 | 3/2005 | Trepanier | |
| 7,107,923 B2 | 9/2006 | Chauncey et al. | |
| 7,114,297 B2 * | 10/2006 | Mathis et al. | 52/169.7 |
| 7,213,531 B2 | 5/2007 | Ahern | |
| 7,640,881 B1 | 1/2010 | Gerst et al. | |
| 8,166,901 B2 * | 5/2012 | Gerst et al. | 114/263 |
| 8,528,281 B2 * | 9/2013 | Boldt | 52/211 |
| 8,793,910 B2 * | 8/2014 | Froio et al. | 40/606.17 |
| 8,936,065 B1 * | 1/2015 | Gillespie | 160/371 |
| 2004/0159273 A1 | 8/2004 | Rogerson | |
| 2007/0028533 A1 | 2/2007 | Stroyer | |
| 2009/0110487 A1 | 4/2009 | Hawkins et al. | |

OTHER PUBLICATIONS

Flotation Systems, Inc.; Catalog for Aluminum Boat Docks; (15 pages), Jan. 2006.
Boat Dock Construction; Website Article; http//www.aluminumboatdocks.com; (2 pages), Aug. 2008.
Anchoring Systems; Website Article; http//www.aluminumboatdocks.com; (4 pages), Aug. 2008.
Marina and Dock Applications; Website Article; http//www.strongwell.com; (2 pages), Aug. 2008.
Mod-U-Dock Modular Boat Docks; Website Article; http//www.modudock.com; (7 pages), Aug. 2008.
Piers, Docks; Website Article; http//www.aqualandmfg.com; (3 pages), Aug. 2008.
Borel Docks—Marine Construction; Website Article; http//www.boreldocks.com; (2 pages), Aug. 2008.
Information About Docks and Sea Walls; Website Article; http//www.innerbanks.biz; (2 pages), Aug. 2008.
Gatorddock; Floating Docks; Website Article; http//www.cmiwaterfront.com; (2 pages), Aug. 2008.
Boat Docks; Website Article; http//www.waterventures.net; (2 pages), Aug. 2008.
Steeldeck an Environmentally Sound, Lifetime Surface for your Dock; Website Article; http//premiermaterials.com; (2 pages), Aug. 2008.
Connect-A-Dock Construction; Website Article; http//lakemarineconstruction.com; (7 pages), Aug. 2008.
EZ Docks; Website Article; http//tmpmarine.com; (2 pages), Aug. 2008.
Candock Floating Dock System; Website Article; http//tmpmarine.com; (2 pages) Aug. 2008.
Shoremaster Waler System Concrete Floating Docks; Website Article; http//tmpmarine.com; (4 pages), Aug. 2008.
Florida Pier Construction; Website Article; http//www.dalesmarine.com; (1 page), Aug. 2008.

* cited by examiner

GUSSET

CROSS-REFERENCE TO RELATED APPLICATIONS

This application claims the benefit of U.S. Provisional Application No. 61/871,738, filed Aug. 29, 2013, the contents of which are expressly incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates generally to a joint member for use in a structural frame, and more specifically, to an improved gusset formed for a fiber-reinforced pultruded material and configured for use as a structural joint support in a bridge, platform, containment frames, or dock structure.

2. Description of the Related Art

It is well-known that docks are man-made structures that generally extend from shore over a body of water. Docks are commonly employed to provide a walkway from the shore to a boat, which may be tethered to a post or piling adjacent the dock. In addition, docks may be used as a location from which to swim or simply relax and enjoy the natural scenery.

Floating docks are commonly used on bodies of water having fluctuating water levels, such as oceans and reservoirs. An exemplary floating dock system has been developed by Applicant, and is the subject of U.S. Pat. Nos. 7,640,881 and 8,166,901, the contents of which are expressly incorporated herein by reference. Many floating docks, including the aforementioned exemplary floating dock system, as well as bridges, platforms, and cooling towers, include a support frame comprised of a plurality of intersecting frame members. The intersecting frame members may be held together through the use of a joint support. In particular, the joint support may serve a dual purpose of positioning the intersecting frame members relative to each other, while also providing structural reinforcement at the joint. Therefore, the joint support is generally formed from a strong durable material.

In most cases, the joint support is formed from a metallic material. Consequently, the joint support is one of the heavier and most costly components of the dock system.

In view of the foregoing, there is a need in the art for an improved joint supporting member which is formed from a lightweight, durable, and cost-effective material. These, as well as other features and advantages of the present invention, will be described in more detail below.

BRIEF SUMMARY OF THE INVENTION

In accordance with the present invention, there is provided an improved joint member, e.g., a gusset, formed from a fiber-reinforced pultruded material. The improved gusset is more lightweight and inexpensive to manufacture than conventional gussets. Furthermore, the fiber-reinforced material is strong enough to provide the structural support needed in most dock systems.

The improved gusset is preferably formed from a pultruded beam that is cut into two adjoining segments. The pultruded beam preferably includes a primary wall, and a plurality of webs extending generally perpendicularly from the primary wall. The adjoining segments may be adjoined in several different angular configurations, including 45°, 90°, 135° or other angles which may be used in the art.

According to one embodiment, there is provided a method of forming a connecting support member, e.g., a gusset, adapted to connect a first structural member to a second structural member such that the first and second structural members collectively define a corner. The method includes forming a pair of beams, wherein each beam is formed from a pultruded material. A slot is formed in each of the pair of beams. The pair of beams are arranged in a non-parallel configuration corresponding to shape of the corner, wherein the slots are formed in the pair of beams such that when the pair of beams are arranged in the non-parallel configuration, the slots are aligned with each other. A common insert is placed within both slots to maintain the pair of beams together in the non-parallel configuration. The insert may be formed of metal or other high strength materials.

The step of forming the pair of beams may include forming the pair of beams from a common beam. The step of forming the pair of beams may include forming each beam to include a primary wall and at least one web extending in a non-parallel direction from the primary wall.

Each beam may include opposed inner and outer faces, wherein the step of forming the slot includes forming the slot such that the slot extends only partially between the inner and outer faces. The method may further include the step of adhering the pair of beams to each other using an adhesive. The method may additionally include the step of forming holes in the beams to receive the adhesive. The pair of beams may be arranged in an orthogonal arrangement.

The insert may be an L-shaped bracket that is completely inserted within the pair of beams. The insert may be placed within both slots to define a captured portion within the slots and an exposed portion outside of slots.

According to another aspect of the invention, there is provided a dock comprising a dock frame including a pair of frame members defining a corner. The dock further includes a connecting support member coupled to the pair of frame members and including a pair of beams, wherein each beam includes a slot formed therein and formed from a pultruded material. The pair of beams are arranged relative to each other in a non-parallel configuration corresponding to shape of the corner. The slots are aligned with each other when the pair of beams are arranged in the non-parallel configuration. An insert is positioned within both slots to maintain the pair of beams together in the non-parallel configuration.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Referring now to the drawings wherein the showings are for purposes of illustrating a preferred embodiment of the present invention only, and not for purposes of limiting the same, there is shown a pultruded beam 10 specifically configured and adapted for use as a structural support member. The pultruded beam 10 is highly adaptable and may be used in one or more capacities as a structural support in several different structural systems, including a dock structure or similar platform-type systems, as well as in other pultruded structural systems, such as a joint support member in a support frame for a cooling tower. The adaptability of the pultruded beam 10 may relate to the ability of the beam 10 to be cut into segments which are then adhered together to form an improved gusset 12, e.g., connecting support member. A gusset 12 formed from the pultruded beam 10 typically weighs less and may be formed at a lower cost compared to conventional metal gussets, without compromising the strength of performance of the gusset 12. Therefore, use of pultruded gussets 12 in dock systems and other pultruded structural systems may reduce the overall cost of the system.

Figure 2:
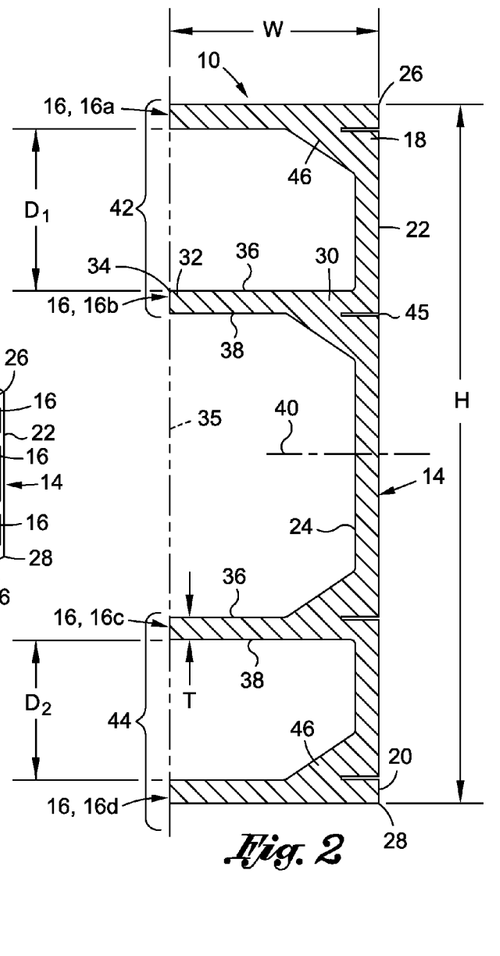
FIG. 2 is a side sectional view of the pultruded beam.

Referring now specifically to FIG. 2, there is shown a cross-sectional view of the pultruded beam 10, which generally includes a primary wall 14 and a plurality of webs 16 extending generally perpendicularly from the primary wall 14 in spaced relation to each other. The primary wall 14 includes a first (upper) end portion 18 and an opposed second (lower) end portion 20, an outer face 22, and an opposing inner face 24. The primary wall 14 includes a first edge 26 at the first end portion 18 and a second edge 28 at the second end portion 20. The primary wall 14 defines a height, "H" as the distance between the first and second edges 26, 28. In a preferred embodiment, the height H is approximately equal to 7½", although it is understood that the height H may be varied without departing from the spirit and scope of the present invention. For instance, the height H may vary depending on the particular application of the beam 10.

The webs 16 extend from the primary wall 14 in spaced relation to each other. In the exemplary embodiment, the pultruded beam 10 includes four webs 16, although other beams 10 may include fewer than four webs 16 or more than four webs 16. Each web 16 includes a proximal end portion 30 coupled to the primary wall 14 and an opposed distal end portion 32 extending away from the primary wall 14. The distal end portion 32 terminates to define a respective distal edge 34. The plurality of distal edges 34 are preferably co-axially aligned along a common axis, referred to herein as the distal edge axis 35. The beam defines a width, "W" as the distance between the outer face 22 of the primary wall 14 and the distal edge axis 35. In a preferred embodiment, the width W is approximately equal to 2¼", although the beam 10 may define other widths W without departing from the spirit and scope of the present invention. Each web 16 additionally includes opposed first and second surfaces 36, 38 to define a web thickness, "T" therebetween. The web thickness T is preferably equal to ¼", although other web thicknesses may also be used.

The cross section of the beam 10 is preferably substantially symmetrical about a transverse symmetrical axis 40 which extends generally perpendicular to the primary wall 14, and generally parallel to the webs 16. In this respect, there are preferably an equal number of webs 16 above the symmetrical axis 40 as there are below the symmetrical axis 40. In the preferred embodiment, a first (upper) pair of webs 42 is disposed on one side of the symmetrical axis 40, while a second (lower) pair of webs 44 is disposed on the other side of the axis 40. The first pair of webs 42 includes an outer web 16a and an inner web 16b. Likewise, the second pair of webs 44 includes an outer web 16d and an inner web 16c. With regard to the first pair of webs 42, the outer web 16a is positioned such that the first surface thereof resides within a plane including the first edge 26. Furthermore, the outer and inner webs 16a, 16b are spaced from each other such that the first surfaces of the respective webs are spaced by a distance, "D1" which is preferably approximately equal to 1¾". With regard to the second pair of webs 44, the outer web 16d is positioned such that the second surface thereof resides within a plane including the second edge 28. Furthermore, the outer and inner webs 16d, 16c are spaced from each other such that the second surfaces of the respective webs are spaced by a distance, "D2" which is preferably approximately equal to 1¾".

According to one embodiment, the beam 10 includes a plurality of web support elements 46 disposed between a respective web 16 and the primary wall 14 to enhance the connection between the webs 16 and the primary wall 14. Each web support element 46 preferably extends between that surface of the web 16 which faces the symmetrical axis 40, and the primary wall 14. In particular, the support elements 46 coupled to the first pair of webs 42 extend between the second (lower) surface 38 of the respective web 16 and the primary wall 14, whereas the support elements 46 coupled to the second pair of webs 44 extend between the first (upper) surface 36 of the respective web 16 and the primary wall 14.

The beam 10 preferably includes an exposed, roughened surface to facilitate adhesion with a dock structural element. In the preferred embodiment, the outer surface 22 of the primary wall 14, the first surface 36 of the first outer web 16a and the second surface 38 of the second outer web 16d are all roughened. The roughened texture may be achieved by forming serrations in the beam 10 at those surfaces.

The beam 10 also preferably includes one or more slots 45 formed therein. The slots 45 are sized and configured to receive a bracket or insert 47 (see FIGS. 4A and 7) for aligning and supporting the beams 10a, 10b during assembly of a gusset 12, or similar structure. The exemplary slots 45 extend into the beam 10 from the outer face 22, although it is contemplated that in other embodiments, the slots 45 may extend into the beam 10 from the inner face 24.

As noted above, the beam 10 may be configured to enable selective configuration of the beam 10 depending on the desired use thereof. For instance, the beam 10 may be used as a structural support in connection with a wide range of pultruded structures, including support frames for docks, cooling towers, and the like. Along these lines, although the following discussion and related figures relate to use of the beam 10 as a support in a dock, it is understood that use of the beam 10 is not limited thereto.

Figure 3:
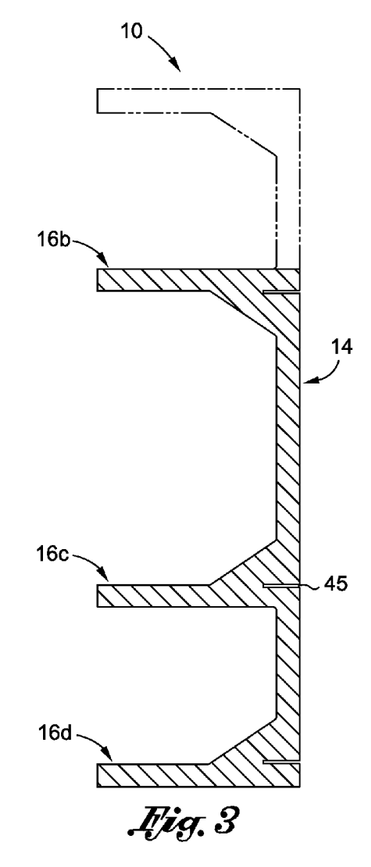
FIG. 3 is a side sectional view of the pultruded beam shown in FIG. 2 with an upper portion of the beam removed therefrom.
Figure 4:
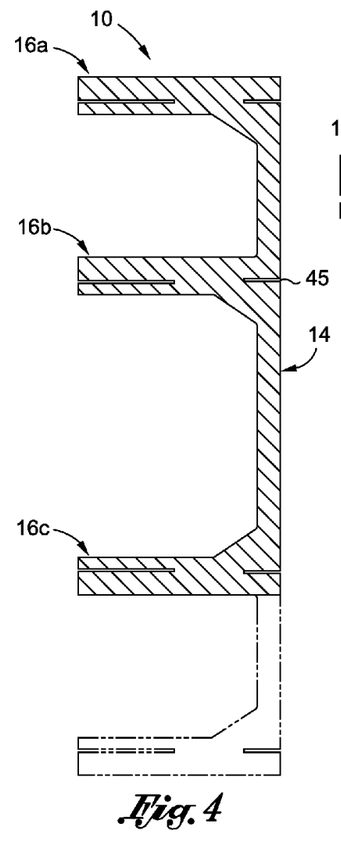
FIG. 4 is a side sectional view of the pultruded beam shown in FIG. 2, with a lower portion of the beam removed therefrom.
Figure 4A:
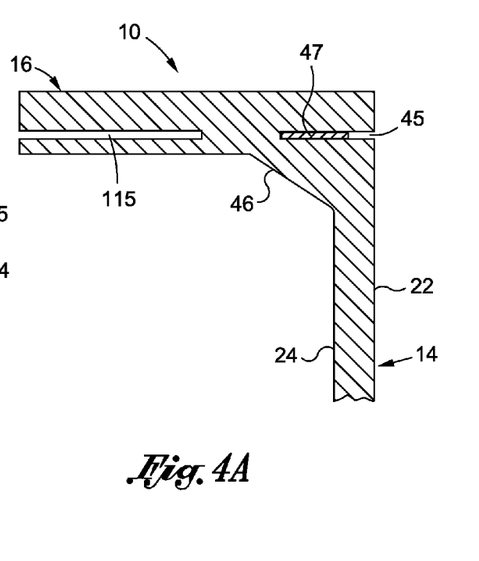
FIG. 4A is a partial side sectional view of the pultruded beam with an insert located within a slot formed within the beam.

Referring now specifically to FIGS. 3 and 4, various aspects of the invention are related to forming the beam 10 in a manner which allows the beam 10 to be customized according to the intended use of the beam 10. For instance, the beam 10 may be used in forming a gusset 12, a support bracket 48, or a cleat support 50. As such, the formation of the various support structures may be achieved by cutting the beam 10 into the desired dimensions for forming the various support structures. FIGS. 3 and 4 illustrate ways in which the beam 10 may be modified to conform to a desired dimensional profile. In particular, FIG. 3 shows an upper portion of the beam 10 removed therefrom, while FIG. 4 shows a lower portion of the beam 10 removed therefrom. The portion removed in FIGS. 3 and 4 includes a web 16 and a portion of the primary wall 14 extending between the removed web and the remaining adjacent web 16. The process of removing the portion of the beam 10 in FIGS. 3 and 4 results in a beam 10 having a shorter height than the original beam.

The beam 10 shown in FIG. 4 also differs from the beam 10 shown in FIG. 3 due to the formation of slot 115 within thickened webs 16. The purpose of the slot 115 will be described in more detail below.

According to one embodiment, the full height H of the beam 10 is configured to fit inside of a channel defined by a standard 8"×2³⁄₁₆"×¼ dock frame member, with approximately 0.025" clearance on the upper and lower bearing surfaces. However, the beam 10 may be cut along a cut axis to size the beam for use in a 6" channel. The cut axis is preferably aligned with the second surface of the second inner web 16c, or the first surface of the first inner web 16b.

Figures 5, 6:
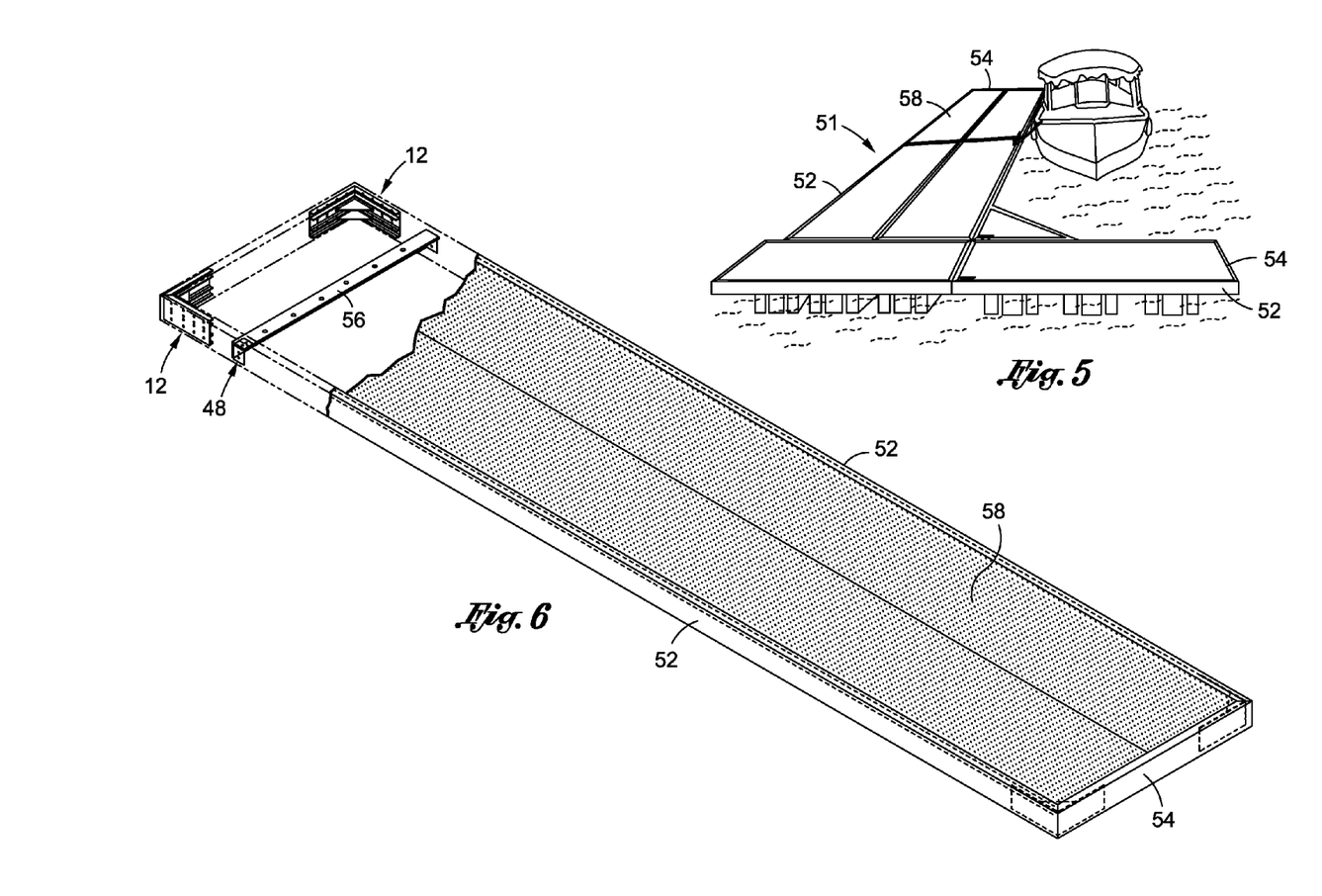
FIG. 5 is an upper perspective view of a dock system utilizing the pultruded beam.
FIG. 6 is an upper perspective, partial cutaway view of a dock section have support elements formed from the pultruded beam.

An upper perspective view of an exemplary floating dock 51 is shown in FIG. 5, while FIG. 6 shows partial cutaway view of the dock 51 to illustrate the internal support elements or gussets 12. The dock 51 generally includes a pair of opposed longitudinal frame members 52 and a pair of opposed transverse frame members 54 coupled to the longitudinal frame members 52 to define four corners. In each corner is a gusset 12 which positions the respective transverse frame member 54 relative to the respective longitudinal frame member 52, and additionally provides structural support to the frame members 52, 54. The dock 51 additionally includes a plurality of support beams 56 extending between the longitudinal frame members 52 for supporting an upper walking plate 58. The support beams 56 are engaged with support brackets 48, which are coupled to respective ones of the longitudinal frame members 52.

Figure 1:
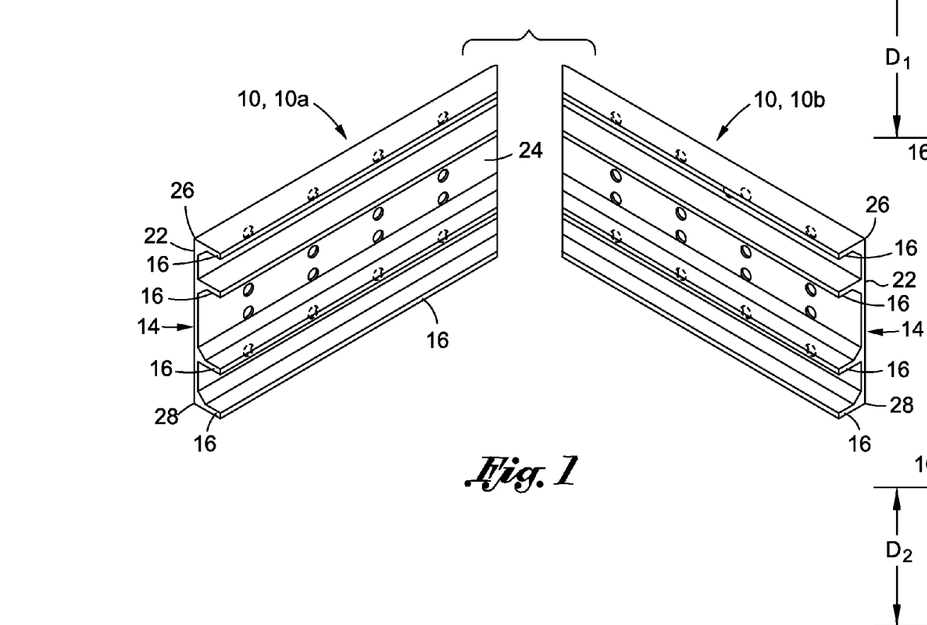
FIG. 1 is an upper perspective view of two beam segments formed from a pultruded beam constructed in accordance with an embodiment of the present invention.

The gussets 12 may be formed using the pultruded beam 10 described above, and as shown in FIGS. 1 and 7. The gusset 12 is formed by cutting the beam 10 into two segments 10a, 10b, which intersect at a miter joint 60. An adhesive may be used to join the two segments together 10a, 10b. The two segments 10a, 10b may be cut at an angle such that when the segments 10a, 10b are joined at the miter joint, the outer faces 22 of the respective primary walls 14 are arranged approximately 90° relative to each other. However, those skilled in the art will appreciate that the segments 10a, 10b may be cut so as to define different angular offsets between the primary walls 14, i.e., the primary walls 14 may define an angle therebetween that is greater than 90° or less than 90°. Those skilled in the art will also appreciate that the segments 10a, 10b may also be arranged in a generally parallel arrangement without departing from the spirit and scope of the present invention.

Figure 7:
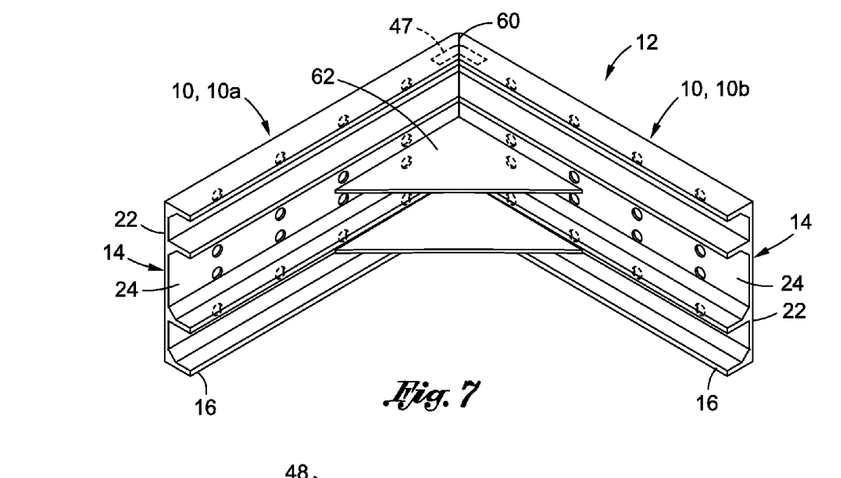
FIG. 7 is an upper perspective view of a gusset formed from the pultruded beam and having a first embodiment of a bracket connecting a pair of beam segments.

Alignment of the beam segments 10a, 10b may be facilitated through the use of bracket or insert 47, which may be inserted into corresponding slots 45 formed in the beam segments 10a, 10b. In this regard, the bracket 47 may hold the beam segments 10a, 10b in the preferred position while an adhesive cures. The bracket 47 may remain attached to the gusset 12 after assembly is complete to provide additional structural support. The bracket 12 is preferably formed from a durable, water resistant material, such as metal, although other materials known in the art may also be used.

According to one embodiment, the gusset 12 includes a corner plate 62 (see FIG. 7) extending between the two segments 10a, 10b. The corner plates 62 may provide reinforcement to the gusset 12 and additionally may be used to position the two segments 10a, 10b during assembly of the gusset 12. It is contemplated that the corner plates 62 may include an aperture formed therein, which is preferably sized to receive a freshwater piling. The corner plate 62 may be formed from a similar water resistant material, such as metal, although other materials are contemplated and may be adhered to webs 16 of the gusset 12 using an adhesive known in the art.

Figure 7A:
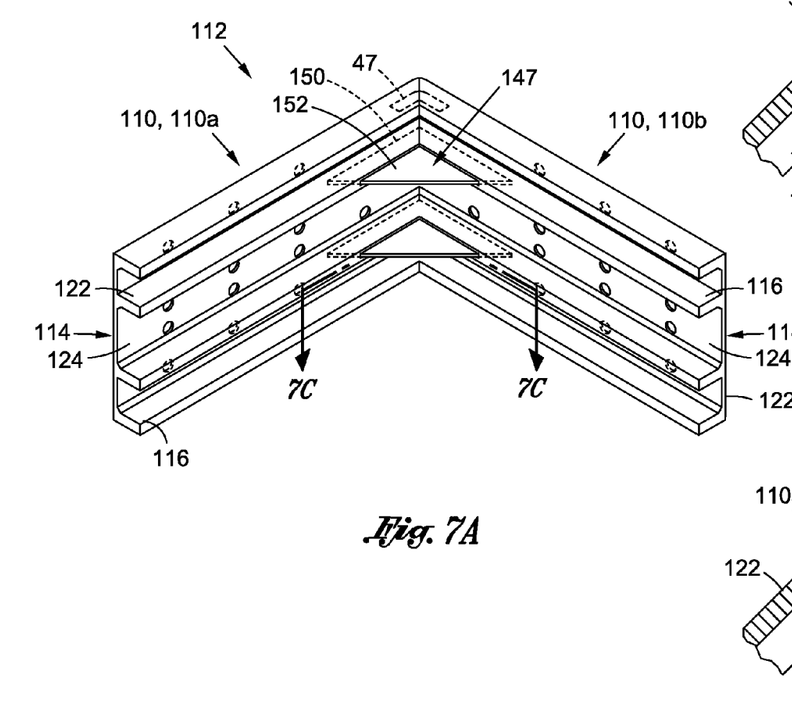
FIG. 7A is an upper perspective view of a gusset formed from the pultruded beam and having a second embodiment of a bracket connecting a pair of beam segments.
Figure 7B:
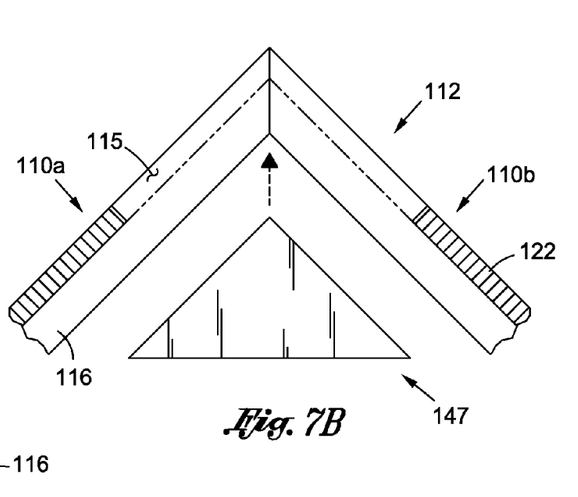
FIG. 7B is a top sectional, partial exploded view of the bracket depicted in FIG. 7A.
Figure 7C:
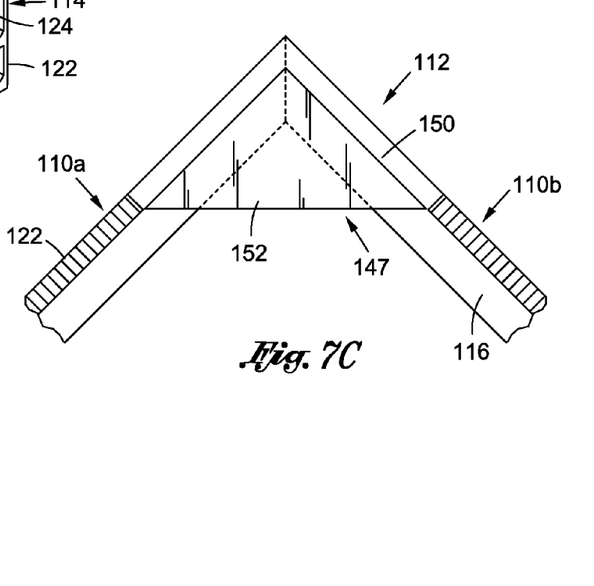
FIG. 7C is a top sectional assembled view of the bracket depicted in FIG. 7A.

Referring now to FIGS. 7A-7C, there is depicted another embodiment of a gusset 112 having an enlarged, more robust bracket 147 than the bracket 47 shown in FIG. 7. The enlarged bracket/insert 147 may be used to provide increased structural support between the adjoining beam segments 110a, 110b. In the embodiment depicted in FIG. 7A, the gusset 112 includes a pair of beam segments 110a, 110b, wherein each beam segment 110a, 110b includes four webs 116. The gusset 112 further includes one or more brackets 147 which are inserted into respective slots 115 formed adjacent each web 116. In this respect, the exemplary gusset 112 includes two brackets 147 attached to two central webs 116; however, it is understood that in other embodiments, the gusset 112 may include fewer brackets 147 than webs 116, or alternatively, more brackets 147 than webs 116. The brackets 147 are typically formed of the same materials as used for the brackets 47.

The slots 115 are formed in each beam segment 110a, 110b at the adjoining end portion of the beam segment 110a, 110b (e.g., in the corner of the resulting gusset 112). It is contemplated that the slots 115 may be formed within the webs 116, or adjacent the webs 116 (e.g., just above the web 116 or just below the web 116). When forming the gusset 112, the beam segments 110a, 110b are arranged such that slots 115 in the pair of beam segments 110a, 110b are aligned so as to allow a bracket 147 to be inserted therein.

In the embodiment shown in FIGS. 7A-7C, the bracket 147 is inserted into the slots 115 from the inside of the corner, wherein the bracket 147 extends into the slot 115 so as to define a captured portion 150 (e.g., that portion of the bracket 147 residing within the slots 115) and an exposed portion 152 (e.g., that portion of the bracket 147 not residing within the slots 115 and therefore is exposed). In this respect, the bracket 147 may also serve the same function as the corner plate 62 described above (e.g., the bracket and corner plate may be integrated into a single element). As such, the exposed portion 152 may extend between the inner faces 124 of the pair of beam segments 110a, 110b.

In the exemplary embodiment depicted in FIGS. 7A-7C, the slot 115 extends completely between the inner and outer faces 124, 122 of the primary wall 114, although it is understood that in other embodiments, the slot 115 may extend only partially therebetween. Furthermore, the slot 115 may extend partially from the outer face 122 toward the inner face 124, or alternatively, partially from the inner face 124 toward the outer face 122.

The bracket 147 may be configured to extend substantially completely along the entire width W of the beam segment 110. In particular, the bracket 147 may extend from the distal edge of the web 116 to the outer face 122 of the primary wall 114. As noted above, the bracket 147 may be used to initially join the beam segments 110a, 110b together and hold the beam segments 110a, 110b in place while an adhesive is used to more securely join the two beam segments 110a, 110b together.

Figure 8:
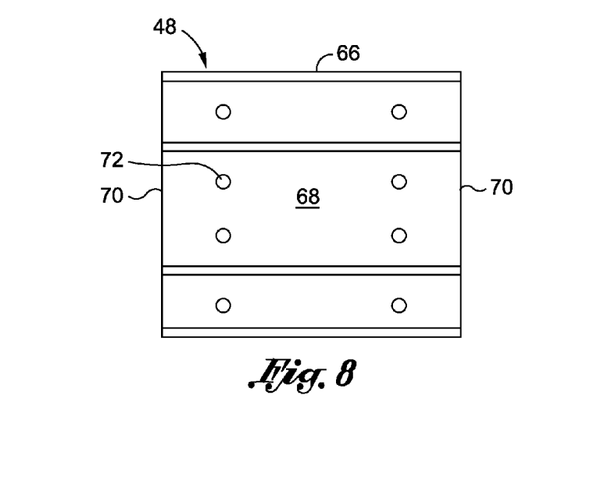
FIG. 8 is a front view of a support bracket formed from the pultruded beam.

Referring now specifically to FIG. 8, the pultruded beam 10 may also be used to form a support brackets 48 which may provide support to an upper walking surface of the dock, or alternatively, may provide support to a transverse frame member. In this respect, the support bracket 48 may provide support to the dock frame at a location spaced from the corner of the dock frame. The support brackets 48 include a primary (upper) load bearing wall 66, an attachment wall 68, and a vertical edge 70 for aligning the support beam 56 with the support bracket 48. The pultruded beam 10 may be cut and positioned such that the primary wall 14 functions as the attachment wall 68, and the first outer web 16a functions as the primary load bearing wall 66. One or more apertures 72 may be formed in the primary wall 66 to allow adhesive to seep through the primary wall 66 for adhering the primary wall 66 to the longitudinal frame member 52.

Figure 9:
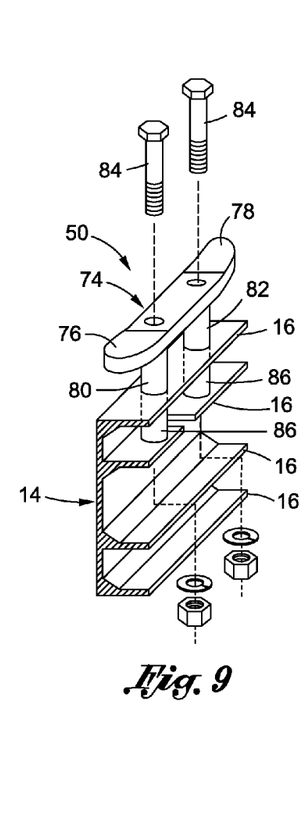
FIG. 9 is a perspective view of a cleat support formed from the pultruded beam.

Referring now specifically to FIG. 9, in addition to being used in forming a gusset, the pultruded beam 10 may further be used as a support member for coupling a cleat 50 to the dock 51. A conventional cleat 50 includes a cleat arm 74 having two opposed end portions 76, 78, and a pair of legs 80, 82 having apertures formed therein. Cleat bolts 84 extend through respective ones of the leg apertures and through corresponding apertures formed in the webs 16 of the pultruded beam 10. A pair of compression tubes 86 may extend around the bolts 84 and between a pair of webs 16 to provide strength to the webs 16.

As noted above, the pultruded beam may be used in a wide variety of applications, and is not limited to use as a structural support member in a dock. In this respect, the pultruded support structure may be implemented into any pultruded structure, including, but not limited to a support structure for a cooling tower.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method of forming a connecting support member adapted to connect a first structural member to a second structural member such that the first and second structural members define a corner, the method comprising the steps of:
    forming a pair of beams, each beam being formed from a pultruded material and having an inner face and an opposing outer face;
    forming a slot in each of the pair of beams, each slot extending completely through the respective beam between the inner and outer faces;
    arranging the pair of beams in a non-parallel configuration corresponding to the shape of the corner, the slots being formed in the pair of beams such that when the pair of beams are arranged in the non-parallel configuration, the slots are aligned with each other; and
    placing a common insert within both slots to maintain the pair of beams together in the non-parallel configuration wherein the insert is placed within both slots to define a captured portion within the slots and an exposed portion outside of slots.

2. The method recited in claim 1, wherein the step of forming the pair of beams includes forming the pair of beams from a common beam.

3. The method recited in claim 1, wherein the step of forming the pair of beams includes forming each beam to include a primary wall and at least one web extending in a non-parallel direction from the primary wall.

4. The method recited in claim 1, further comprising the step of connecting a corner plate to the pair of beams.

5. The method recited in claim 1, further comprising the step of adhering the pair of beams to each other using an adhesive.

6. The method recited in claim 1, further comprising the step of forming holes in the beams to receive an adhesive.

7. The method recited in claim 1, wherein the arranging step includes arranging the pair of beams in an orthogonal arrangement.

8. The method recited in claim 1, wherein the insert is an L-shaped bracket that is completely inserted within the pair of beams.

9. A connecting support member adapted to connect a first structural member to a second structural member such that the first and second structural members define a corner, the connecting support member comprising:
    a pair of beams, each beam having an inner face, an opposing outer face, and a slot formed therein and extending completely between the inner and outer faces, each beam being formed from a pultruded material, the pair of beams being arranged relative to each other in a non-parallel configuration corresponding to the shape of the corner, the slots being aligned with each other when the pair of beams are arranged in the non-parallel configuration; and
    an insert positioned within both slots to maintain the pair of beams together in the non-parallel configuration wherein the insert is an L-shaped bracket that is completely inserted within the pair of beams.

10. The connecting support member recited in claim 9, wherein each beam includes a primary wall and at least one web extending in a non-parallel direction from the primary wall.

11. The connecting support member recited in claim 9, further comprising a corner plate coupled to the pair of beams.

12. The connecting support member recited in claim 9, further comprising an adhesive adapted to adhere the pair of beams together.

13. The connecting support member recited in claim 1, further comprising a plurality of holes in the pair of beams.

14. The connecting support member recited in claim 9, wherein pair of beams are arranged in an orthogonal arrangement.

* * * * *